United States Patent
Sousek et al.

(10) Patent No.: US 6,796,419 B2
(45) Date of Patent: Sep. 28, 2004

(54) BELT TENSIONING ASSEMBLY

(76) Inventors: Eugene Sousek, 14 Fiesta Ct., Appleton, WI (US) 54911; Charles Catlin, 408 Beaulieu Rd., Neenah, WI (US) 54956; Greg Beck, 3700 Chestnut La., Appleton, WI (US) 54915

(*) Notice: Subject to any disclaimer, the term of this patent is extended or adjusted under 35 U.S.C. 154(b) by 0 days.

(21) Appl. No.: 10/408,933

(22) Filed: Apr. 8, 2003

(65) Prior Publication Data

US 2003/0192776 A1 Oct. 16, 2003

Related U.S. Application Data

(60) Provisional application No. 60/372,457, filed on Apr. 12, 2002.

(51) Int. Cl.[7] ............................................. B65G 23/44
(52) U.S. Cl. ..................................... 198/814; 198/813
(58) Field of Search ................................ 198/813, 814, 198/816; 474/135

(56) References Cited

U.S. PATENT DOCUMENTS

| | | |
|---|---|---|
| 598,658 A | 2/1898 | Gilman |
| 1,074,562 A | 9/1913 | Tirrill |
| 1,835,617 A | 12/1931 | Stewart |
| 2,663,195 A | 12/1953 | Horan |
| 2,924,982 A | 2/1960 | Harrer |
| 3,479,894 A | 11/1969 | De Buhr et al. |
| 4,011,767 A | 3/1977 | Nelson |
| 4,253,343 A * | 3/1981 | Black et al. ................. 474/135 |
| 4,518,373 A | 5/1985 | Roth |
| 4,932,926 A | 6/1990 | Lauderbach et al. |
| 5,026,326 A * | 6/1991 | Pollich et al. ............... 474/134 |
| 5,045,031 A | 9/1991 | Thomey |
| 5,129,864 A | 7/1992 | Quintus et al. |
| 5,458,051 A * | 10/1995 | Alden et al. ................. 198/813 |
| 6,090,001 A | 7/2000 | Cantwell |
| 6,120,401 A | 9/2000 | Wilken |
| 6,176,071 B1 | 1/2001 | Thorman et al. |
| 6,206,797 B1 | 3/2001 | Quintus |
| 6,282,873 B1 | 9/2001 | Wilken |

FOREIGN PATENT DOCUMENTS

| | | | | |
|---|---|---|---|---|
| DE | 3631117 | * | 3/1988 | ................. 198/814 |
| GB | 491829 A | | 9/1938 | |
| GB | 922203 | * | 3/1963 | ................. 198/814 |

\* cited by examiner

*Primary Examiner*—James R. Bidwell
(74) *Attorney, Agent, or Firm*—Boyler Fredrickson Newholm Stein & Gratz, S.C.

(57) ABSTRACT

A belt tensioning assembly for use with a power transmission system including a belt extending between a driver pulley and a driven pulley is provided. The tensioning assembly includes an idler engageable with the belt and rotatably attached to a frame pivotally secured to a base for the power transmission system adjacent the driver pulley. A biasing assembly is pivotally attached between the frame and the base for the transmission system and includes a biasing mechanism adapted to urge the idler contact with into the belt. As the tension in the belt changes due to changes in the power demand, the idler is automatically urged with varying force against the slack side of the belt by the biasing mechanism to provide near constant tension on the belt as it moves between the pulleys.

20 Claims, 6 Drawing Sheets

BELT TENSIONING ASSEMBLY

CROSS REFERENCE TO RELATED APPLICATIONS

This application claims priority from U.S. Provisional Patent Application Ser. No. 60/372,457, which was filed on Apr. 12, 2002.

FIELD OF THE INVENTION

The present invention relates to systems for the transmission of rotary motion from a power source to a driven element, and more specifically to a tensioning assembly used in conjunction with a power transmission system to supply tension to a belt interconnected between the power source and the driven element.

BACKGROUND OF THE INVENTION

In many applications, it is necessary to transfer the rotary motion of an output shaft connected to a power source from the output shaft to a driven element spaced from the power source. To accomplish this, normally a chain or belt is positioned around a first member, such as a pulley, fixed to the output shaft of the power source, and around a second, similar member fixed to a rotatable input shaft for the driven element.

In those circumstances where the power source is spaced a sizeable distance from the driven element, it is more cost effective to utilize a belt to operably connect the output shaft of the power source to the input shaft of the driven element. This is because a belt is easy to install, does not require lubrication, is very clean in operation, has lower maintenance, repair and/or replacement costs, and is able to dampen the shock loads transmitted by the belt between the power source and the driven element.

However, one downside to the use of a belt with this type of power transmission system arises due to the types of material that are used to form the belt. More specifically, the belt is normally constructed of a flexible material, such as a rubber, that enables the belt to be formed in an endless or looped shape that is readily positioned in engagement with the output and input shafts. While these types of materials for forming the belt are very tough and do not break easily, over time the belt will stretch due to an inherent stretch factor present in the material. This enables the belt to loosen and slip with regard to the rotation of the pulleys on the output and input shafts, such that the power from the power source can be sporadically, or not effectively transferred via the belt to the driven element.

In order to compensate for the stretching of the belt, one solution that has been developed involves mounting the power source to a sliding support which allows the power source to be moved with respect to the driven element to properly tension the belt. More specifically, as the belt stretches over time, the power source can be moved away from the driven element in order to compensate for the stretching of the belt.

An alternative solution developed to solve the above problem is to mount an idler to the power source that can movably contact and selectively apply tension to the belt. An example of a mechanism of this type is illustrated in Nelson U.S. Pat. No. 4,011,767, which is incorporated herein by reference. In this mechanism, the idler is pivotally secured on or adjacent the power source and is biased by a spring into contact with the belt. The tension applied to the idler by the spring is sufficient to approximately maintain a desired level of tension on the belt during various operating conditions of the power source.

However, in applications where the power source is quite large, i.e., approximately 500 HP and above, the design of the prior art idlers does not enable them to effectively and properly tension the belt by themselves as the magnitude of the forces required to be applied to the belt is too large for a spring-biased idler to effectively tension the belt. Thus, with these large power sources, to solve the problem of belt slippage, the first solution is utilized in that the power source is usually mounted to a base capable of sliding with respect to the fixed position of the driven element. This enables the power source to be moved a specified distance away from the driven element in order to properly tension the belt extending around the power source output shaft and the driven element input shaft.

However, while moving the power source away from the driven element effectively tensions the belt, other problems arise when using these large power sources. More specifically, in applications where the size of the power source utilized is large, the amount of belt stretching and the loads applied to the shafts on the power source and driven element, and the bearings connecting the shafts to the power source and driven element are greatly affected by the amount of power transmitted from the power source to the driven element by the belt. For example, when utilizing a large power source, extreme pulling forces are exerted by the belt on the bearings and shafts connected to the power source and driven element as a result of the operation of the power source and the driven element. These pulling forces can misalign the shafts with respect to their respective components, consequently shifting the bearings causing friction and heat and lubrication problems with the bearings positioned around the rotating shafts.

In order to overcome the shaft and bearing misalignment problems associated with the use of these larger power sources, a shaft extension or jack shaft can be positioned between the connection point of the belt to the power source, i.e., the pulley, and the power source itself. Most often the jack shaft is rigidly but rotatably mounted to pillow blocks adjacent the power source and is coupled at one end to the output shaft of the power source. The rigid structure of the jack shaft is such that any pulling forces exerted by the belt on the jack shaft are dissipated by the jack shaft and pillow blocks and are not transmitted to the output shaft, thereby preventing any misalignment of the output shaft or bearings. Therefore, the jack shaft provides enhanced strength and rigidity to the output shaft of the power source, such that the pulling forces or loads applied to the pulley and the jack shaft by the belt will not affect the alignment of the jack shaft and output shaft with respect to the power source. The same is true when the input shaft of the driven element is connected to a jack shaft as well.

However, while the presence of a jack shaft greatly reduces the occurrence of any misalignment of the respective shafts and pulleys, the size of the jack shaft used with the large power source is necessarily quite large itself, thereby increasing the overall size and weight of the apparatus that needs to be slidably mounted with respect to the driven element in order to properly tension the belt. As a result, larger mechanical forces are required to slide both the power source and the jack shaft, resulting in a greater cost for the overall power transmission system including these components.

In order to keep costs for power transmission assemblies of this type down, it is desirable to develop a power transmission system including a belt tensioning assembly compatible with a large power source that does not require the movement of the power transmission system with respect to the driven element. It is also desirable to develop a belt tensioning assembly that automatically controls the tension on the belt to both avoid slippage of the belt with respect to the pulleys, and misalignment of the output and input shafts and associated bearings with respect to the power source and driven element either in addition to or without a jack shaft.

SUMMARY OF THE INVENTION

It is an object of the present invention to provide a belt tensioning assembly for a power transmission system capable of tensioning a belt connected to the transmission system without having to slide or otherwise move the power source relative to a driven element.

It is another object of the present invention to provide a belt tensioning assembly for a power transmission system that is biased to constantly and automatically adjust the force of the tensioning assembly exerted on the belt during the operation of the power transmission system to maintain a specified amount of tension on the belt.

It is another object of the present invention to provide a belt tensioning assembly that automatically adjusts the force of the tensioning assembly on the belt when the output of the power source changes dramatically in order to compensate for sharply increasing or decreasing loads applied to the shafts and bearings of the system, making the use of a shaft extension or jack shaft connected to the output shaft of the power source optional within the radial load limits of the power source, and to eliminate the misalignment of the shafts with the power source and the driven element and the generation of heat within the bearings.

It is still another object of the present invention to provide a belt tensioning assembly for a power transmission system that allows for a reduction in the size of the bearings and shafts connected to the power source and to the driven element.

It is still a further object of the present invention to provide a power transmission system including a belt tensioning assembly that has a simple construction, allowing for inexpensive maintenance and easy replacement of any damaged and/or worn parts.

The present invention is an automatic belt tensioning assembly located adjacent to a power transmission system having a power source with an output shaft, a driven element with an input shaft, a pair of pulleys fixed to the output shaft and input shaft, and an endless belt disposed around the pulleys. The tensioning assembly includes a frame pivotally secured on or adjacent the power source or engine for the power transmission assembly and an idler roller rotatably attached to the frame opposite the power source. The idler contacts the slack side of the belt extending between the pulleys on the power source and the driven element, respectively. The idler is biased to deflect the belt in order to apply a proper amount of tension to the belt in order to optimize the transmission of power from the power source to the driven element depending upon the operating conditions of the power source.

The amount of force applied to the belt by the idler is controlled by a self-adjusting biasing mechanism attached between the power transmission system frame and the idler frame. The biasing mechanism urges the idler into contact with the belt, such that the idler can contact the belt with varying amounts of force depending upon the force applied by the belt to the idler in opposition to the bias of the adjustment mechanism against the belt. More specifically, the biasing mechanism includes a tension shaft pivotally mounted adjacent the power source but spaced from the pivot frame. The shaft is also pivotally mounted opposite the power source to the pivot frame using a guide block pivotally attached to the pivot frame and fixed to a sleeve slidably disposed on the tension shaft. The guide block is engaged by one end of a biasing member that is engaged at the opposite end by a cap fixed to a top end of the tension rod. As the idler is moved up and down based on the varying amounts of tension present in the slack side of the belt, the tension rod pivots with the idler such that the biasing member is either compressed or expanded, which allows the biasing member to in turn place more or less tension on the belt through the idler as necessary.

Various other features, objects and advantages of the invention will be made apparent from the following detailed description taken together with the drawings.

BRIEF DESCRIPTION OF THE DRAWINGS

The drawings illustrate the best mode currently contemplated of practicing the invention.

In the drawings:

FIG. 2A is a partially broken away cross-sectional view alone line 2A—2A of FIG. 1 and the belt tensioning assembly of FIG. 2;

DETAILED DESCRIPTION OF THE INVENTION

Figure 1:
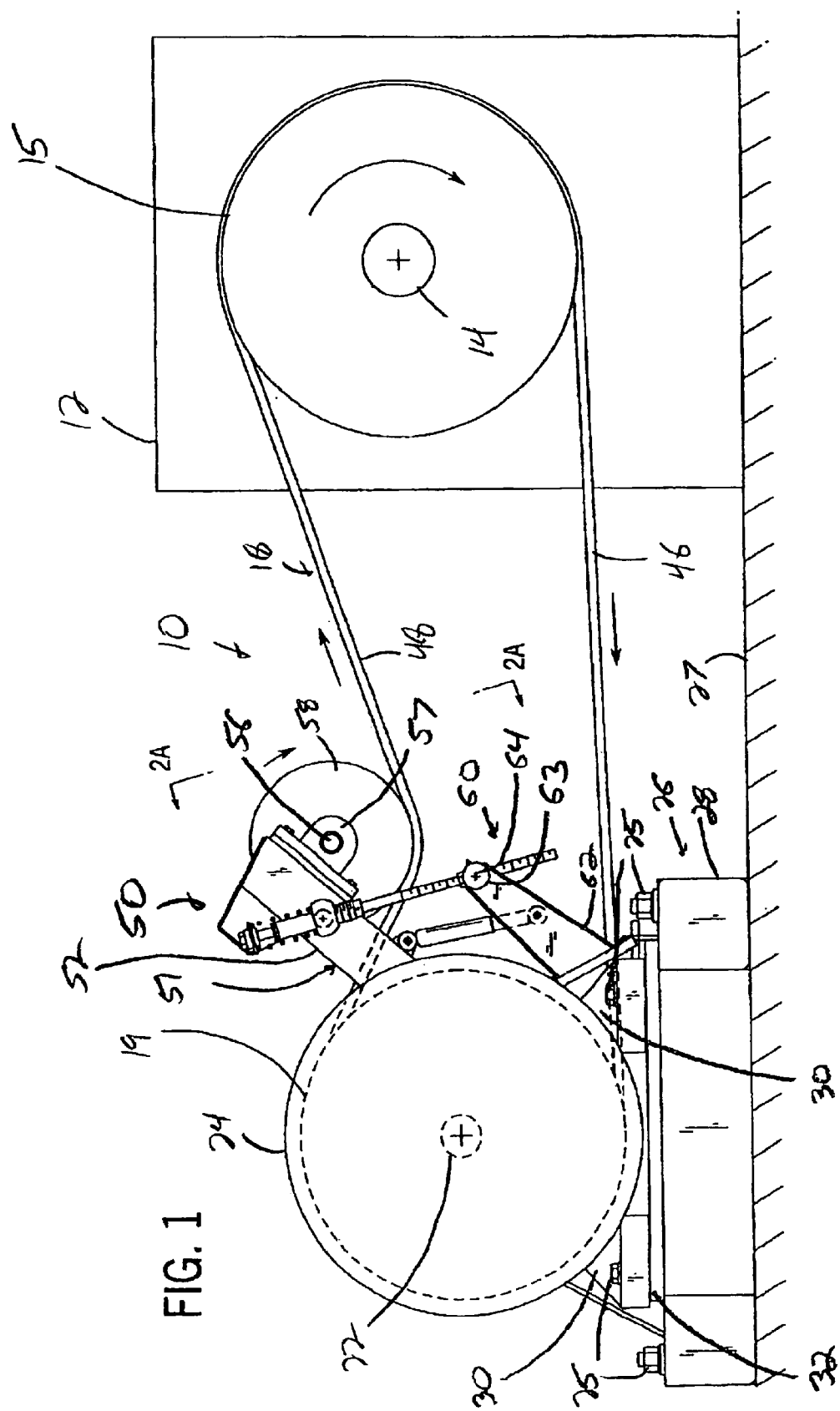
FIG. 1 is a side plan view of the power transmission system operably connected to a driven element.
Figure 2:
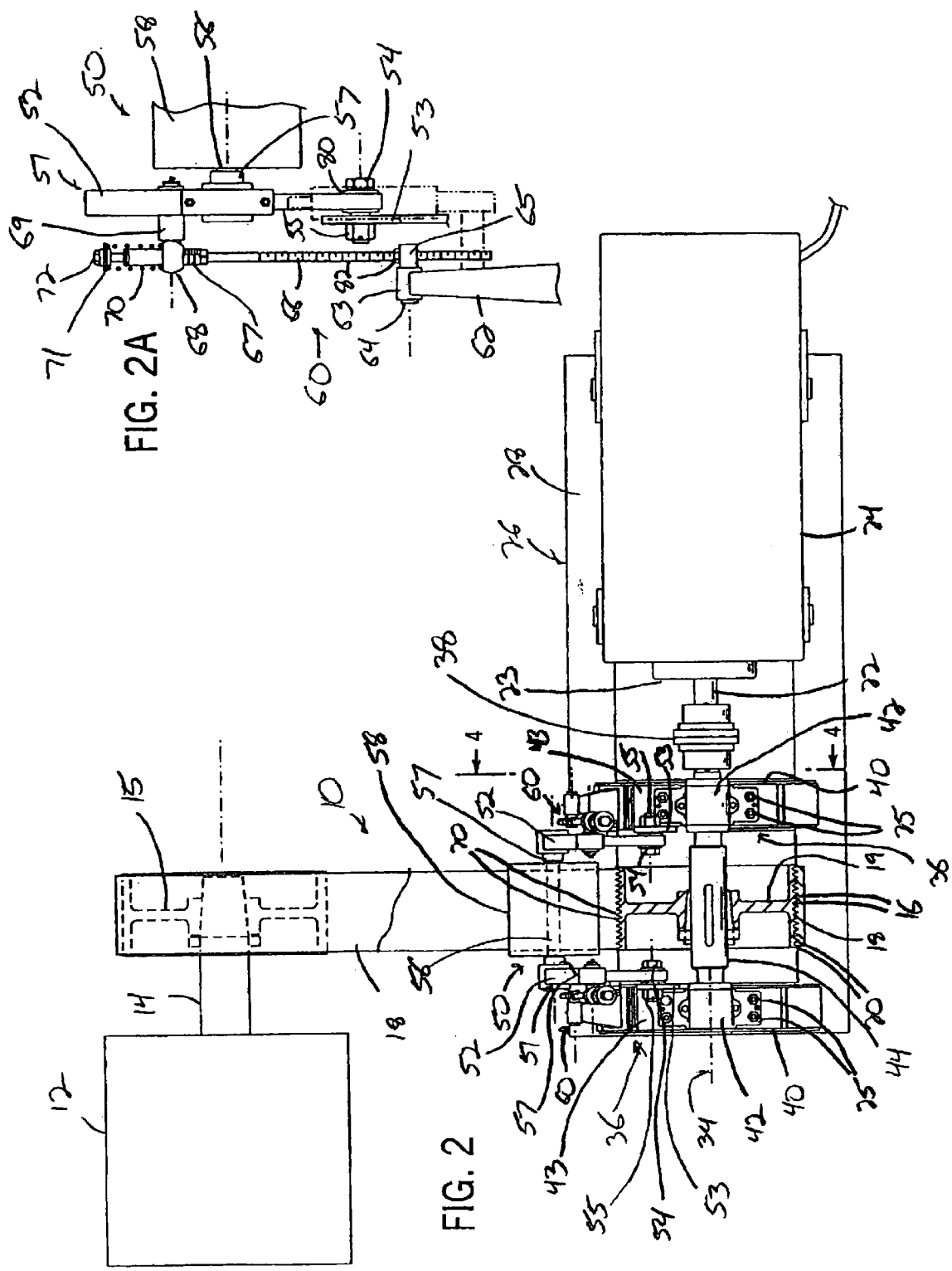
FIG. 2 is a partially broken away, top plan view of the belt tensioning assembly of the present invention connected to the power transmission system of FIG. 1.

With reference now to the drawing figures in which like reference numerals designate like parts throughout the disclosure, a power transmission system indicated generally at 10 is shown connected to a driven element 12 in FIGS. 1 and 2. The driven element 12 can be any machine incorporating an input shaft 14 that extends outwardly from the element 12 and is mounted within a bearing assembly (not shown) that allows the shaft 14 to rotate freely with respect to the exterior of the element 12. For example, the driven element 12 can be a rock crusher of the type normally utilized at a mine site. A driven pulley 15 is connected to the shaft 14 opposite the element 12 in a conventional manner. The pulley 15 can be any conventional or suitable type of pulley used for these purposes, but is preferably formed with a number of peripheral grooves (not shown) disposed across the pulley 15.

The driven pulley 15 is operably connected to a belt 18 that is disposed around the pulley 15 in engagement with the grooves. The belt 18 can be any suitable type of belt utilized with driven elements 12 of this type, such as a belt having a number of V-shaped ridges 16 and formed of a tough, resilient and flexible material, such as a woven fabric or rubber, among others, which may also include a number of reinforcing cables (not shown) formed of interwoven metal strands extending therethrough. The belt 18 is maintained on the driven pulley 15 by the engagement of the ridges 16 on the belt 18 with the grooves and is connected opposite the driven pulley 15 to a driver pulley 19 fixedly mounted to an output shaft 22 rotatably connected to a bearing assembly 23 disposed on a power source 24. The driver pulley 19 is formed similarly to the driven pulley 15 and preferably includes a number of peripheral grooves 20 that grip the ridges 16 on the belt 18. The presence of the grooves on each pulley 15 and 19 enable the pulleys to better grip the belt 18 and prevent slippage of the belt 18 with regard to the pulleys 15 and 19.

The power source 24 can be any type of power source capable of providing the necessary amount of power to the driven element 12. In a preferred embodiment, the power source 24 has an output of approximately eight hundred (800) horsepower or more. The power source 24 is fixedly mounted to a base 26 by anchor bolts 25 inserted through openings in the power source 24 and engaged with the base 26 to fix the power source 24 to the base 26. The power source 24 and base 26 are maintained a specified distance from the driven element 12 by the further engagement of additional anchor bolts 25 between the base 26 and a support surface 27, such as a concrete floor, on which the base 26 rests in order to retain the power source 24 in the specified position with respect to the driven element 12.

Figure 4:
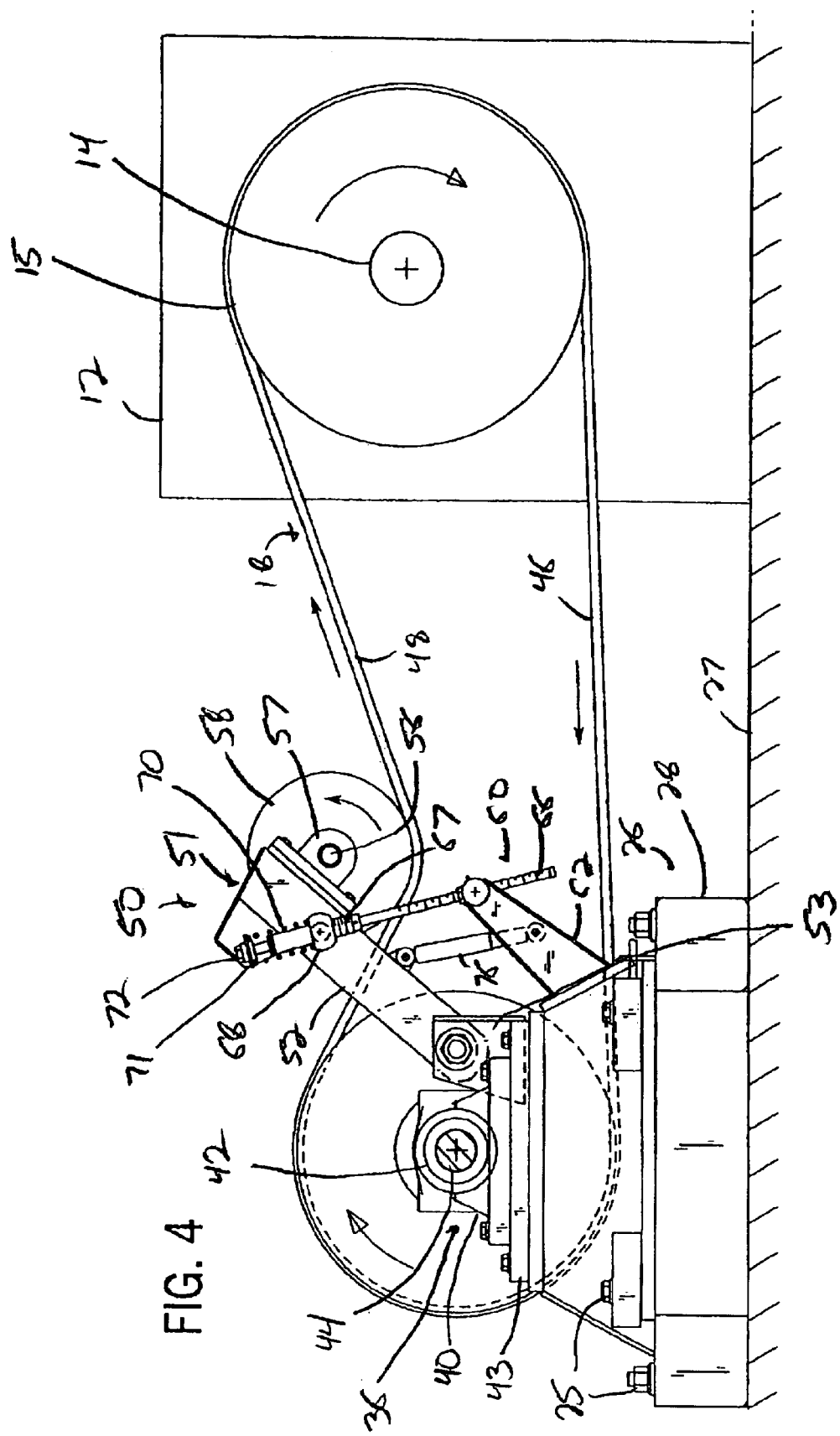
FIG. 4 is a cross-sectional view alone line 4—4 of FIG. 2.
Figures 5, 6:
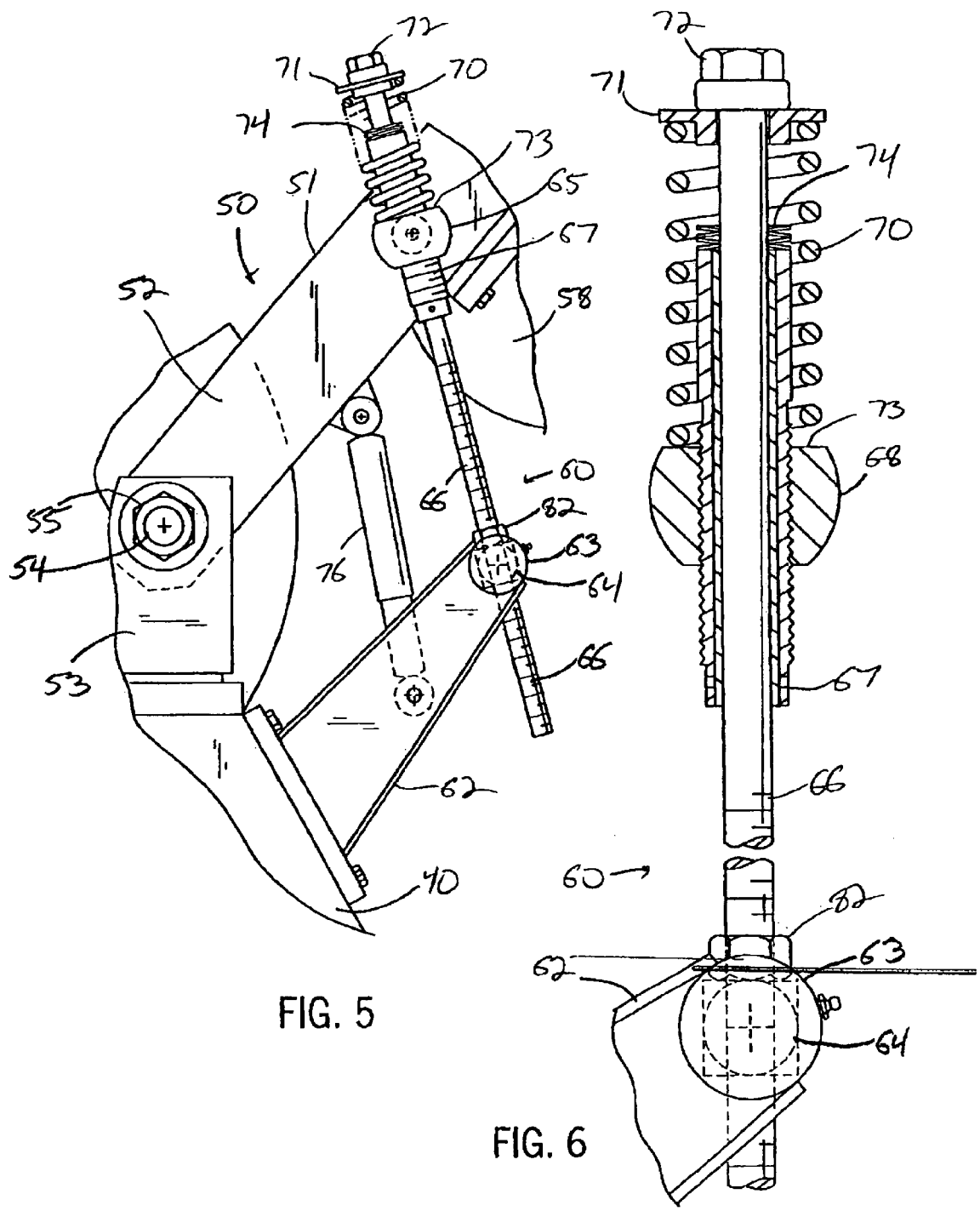
FIG. 5 is a partially broken away side plan view of the tensioning assembly of FIG. 4 in an uncompressed state.
FIG. 6 is a cross-sectional view along line 6—6 of FIG. 5.
Figure 7:
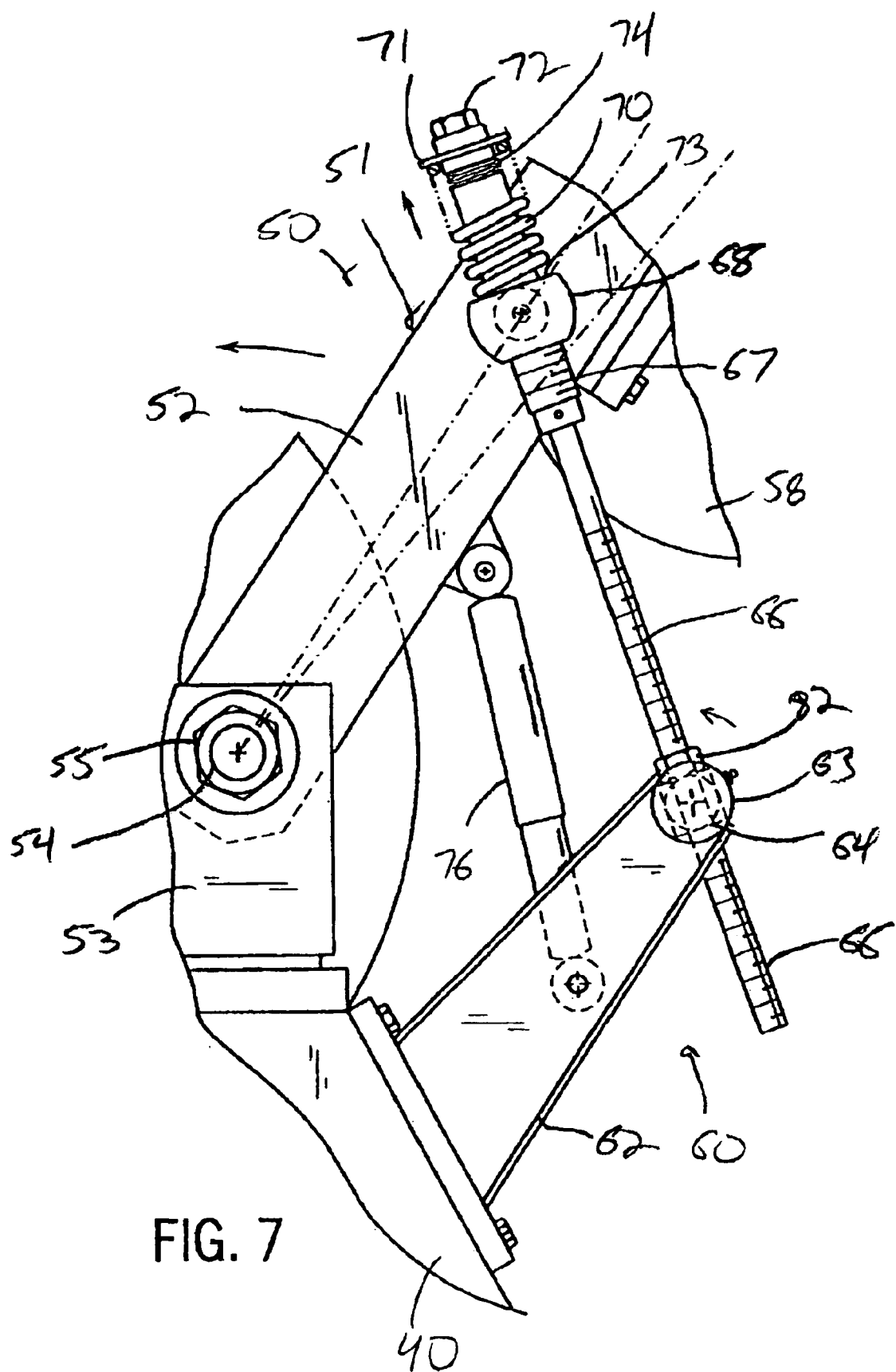
FIG. 7 is a partially broken away side plan view of the tensioning assembly of FIG. 4 in a compressed state.

More specifically, as best shown in FIGS. 1, 2 and 4, the base 26 includes a generally rectangular frame 28 positioned on the support surface 27, and a pair of power source mounts 30 fixed to the power source 24 and extending downwardly to the rectangular frame 28. The mounts 30 are fixed to the frame 28 using the anchor bolts 25 in order to retain the power source 24 on the frame 28. Spacers 32 can also be used in conjunction with the mounts 30 to elevate the power source 24 with respect to the frame 28 in order to position the power source 24 at the appropriate height relative to the driven element 12.

The output shaft 22 extends outwardly from the power source 24 along a rotational axis 34 of the power source 24 and is connected to a pulley mount assembly 36 opposite the power source 24 by a coupling 38. The pulley mount assembly 36 includes a pair of pulley mounts or pillow blocks 40 spaced from one another and secured to the frame 28 using anchor bolts 25, and a pair of shaft bearing assemblies 42 secured within the mounts 40 opposite the frame 28. Similarly to the power source mounts 30, the pulley mounts 40 can be used with spacers 43 disposed between the bearings 42 and the frame 28 in order to position the bearings 42 in alignment with the shaft 22.

Figure 3:
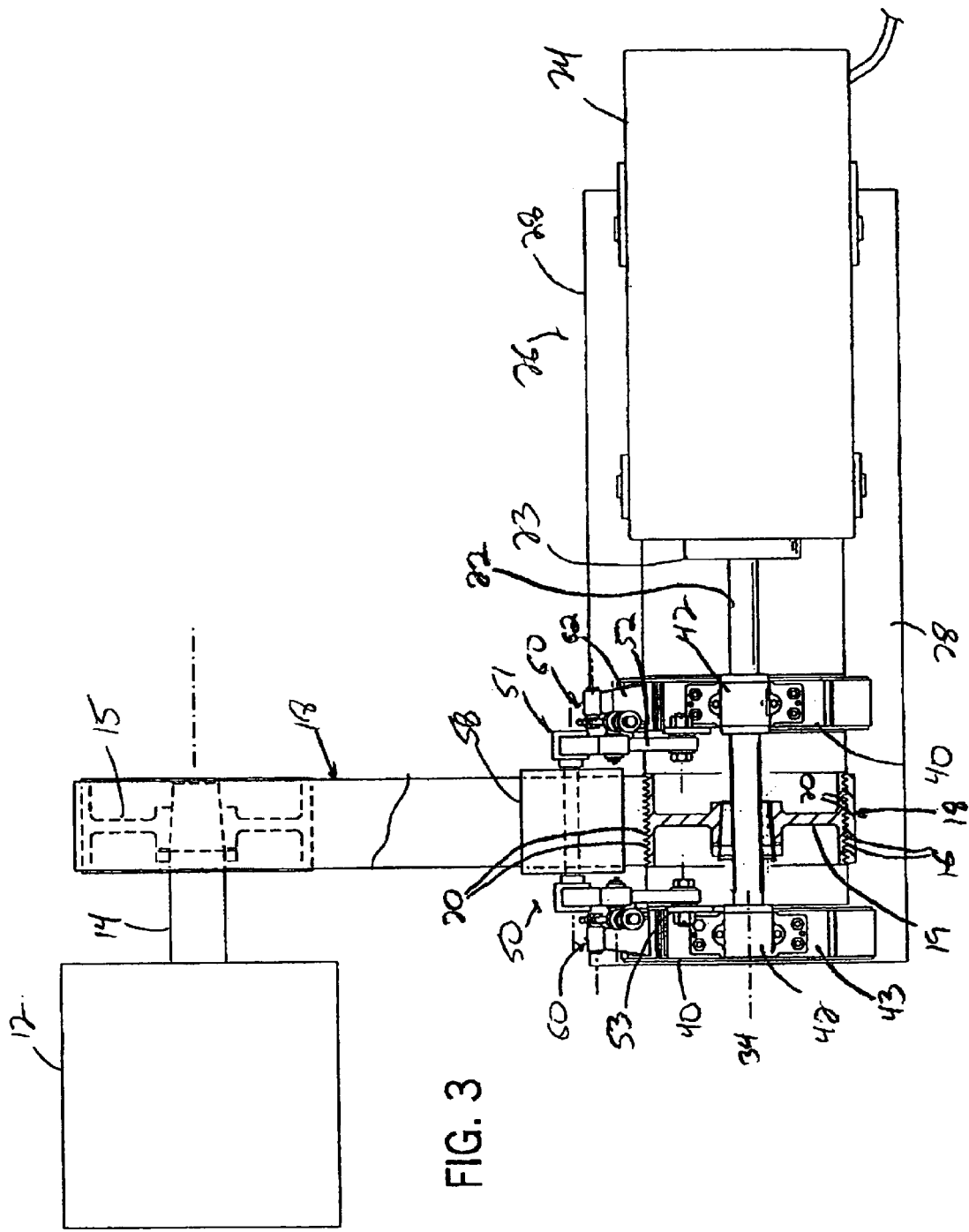
FIG. 3 is a partially broken away top plan view of a second embodiment of the belt tensioning assembly of FIG. 1.

A shaft extension or jack shaft 44 is rotatably retained between the mounts 40 within the bearing assemblies 42 in alignment with the output shaft 22 along the axis 34. One end of the shaft extension 44 adjacent the power source 24 extends through the associated mount 40 and into engagement with the coupling 38. The shaft extension 44 supports the drive pulley 19 between the bearing assemblies 42 such that the drive pulley 19 rotates in conjunction with the shaft extension 44 when the shaft extension 44 is rotated by the output shaft 22 through the coupling 38. The shaft extension 44 provides added support to the drive pulley 19 and increases the range of power that can be transferred to the element 12 using the power transmission system 10 due to the larger size of the shaft extension 44 and bearing assemblies 42 that resist misalignment when large amounts of pull are exerted on the shaft extension 44 and bearing assemblies 42 by the belt 18. Alternatively, the coupling 38 and the shaft extension 44 can be omitted entirely and the drive pulley 19 can be mounted to the output shaft 22 directly if no mounts 40 are used, or to a section of the output shaft 22 extending from the power source 24 through each of the mounts 40, as shown in FIG. 3.

Looking back at FIGS. 1, 2 and 4, the belt 18 is engaged with and positioned around the exterior of both the driven pulley 15 and drive pulley 19 and forms a tensioned side 46 of the belt 18 disposed adjacent the support surface 27, and a slack side 48 of the belt 18 opposite the tensioned side 46. In order to provide the necessary tension on the slack side 48 and prevent the belt 18 from slipping with respect to the pulleys 15 and 19 to ensure the proper operation of the transmission system 10, the system 10 also includes a tensioning assembly 50 attached to the pulley mount assembly 36. The tensioning assembly 50 includes a pivot frame 51 pivotally secured between the mounts 40 and disposed between the drive pulley 19 and the driven pulley 15. The pivot frame 51 includes a pair of pivot arms 52 extending outwardly from the mounts 40. The arms 52 are each rotatably attached to arm mounts 53 at one end, which are positioned on the mounts 40 on opposite sides of the drive pulley 19, by bolts 54 inserted through aligned openings (not shown) in the arms 52 and the arm mounts 53 and secured therein by nuts 55. A bearing 80 can also be positioned between each of the arms 52 and the bolts 54 to facilitate the rotation of the arms 52 about the bolts 54. The arms 52 support a pivot shaft 56 rotatably connected between a pair of bearings 57 disposed on each of the pivot arms 52 and spaced from the mounts 53. Between the bearings 57, the pivot shaft 56 is fixedly connected to a generally cylindrical idler roller 58 that is rotatable in conjunction with the pivot shaft 56 and is positioned in alignment with the driven pulley 15 and the driver pulley 19. The positioning of the pivot arms 52 and shaft 56 is such that the idler roller 58 contacts the slack side 48 of the belt 18 in order to depress the slack side 48 towards the tension side 46 with the necessary force and properly tension the belt 18 when the power transmission system 10 is in operation.

To maintain the proper tension on the slack side 48 through contact of the idler roller 58 with the slack side 48, the tensioning assembly 50 also includes a pair of biasing assemblies 60 disposed on opposite sides of the pivot frame 51. Each biasing assembly 60 is formed of a support arm 62 fixedly connected to one of the mounts 40 and spaced outwardly from the adjacent arm mount 53 and pivot arm 54. The support arm 62 includes a sleeve 63 located opposite the mount 40 in which is disposed a threaded pivot shaft 64 that is engaged with a pivot block 65 opposite the sleeve 63. The pivot block 65 is connected to a tension rod 66 that extends upwardly from the block 65 towards the idler roller 58. The block 65 is fixed on the rod 66 where desired by a locking nut 82 disposed on the rod 66 in engagement with an upper end of the block 65 to prevent the rod 66 from sliding with respect to the block 65, while allowing the block 65 and rod 66 to pivot with regard to the sleeve 63 and pivot shaft 64.

For each assembly 60, generally opposite the pivot block 65, the rod 66 includes a cylindrical adjustment collar 67 slidably disposed on the rod 66. The collar 67 is externally threaded such that the collar 67 can be engaged with a guide block 68 having an internally threaded opening (not shown). The guide block 68 includes a pivot pin 69 that is rotatably secured to the guide block 68 and extends between the guide block 68 and the pivot arm 52. The pivot pin 69 is engaged with pivot arm 52 within a bearing (not shown) positioned in the arm 52 generally opposite the bolt 54. The attachment of the guide block 68 to the pivot arm 52 by the pivot pin 69 allows the guide block 68 and rod 66 to pivot with respect to the pivot arm 52 when the pivot arm 52 moves about the bolt 54 due to the tension exerted on the idler roller 58 by the slack side 48 of the belt 18.

In order to control the amount of movement of the block 68 and rod 66 and thereby control the tension exerted on the slack side 48 of the belt 18 by the idler roller 58, each biasing assembly 60 also includes a biasing member or spring 70. The spring 70 is positioned around the rod 66 and collar 67 between the guide block 68 and an end flange 71 fixed to the rod 66 opposite the pivot block 65, such as by a locking nut 72 or by an alternative means, such as welding. The guide block 68 is formed with a flat upper surface 73 on which the spring 70 rests, and the block 68 and flange 71 may each also be formed with an upturned peripheral ridge (not shown) to engage and retain each end of the spring 70 in alignment with the rod 66. The collar 67 also carries a number of spring washers 74 opposite the guide block 68 that operate to cushion any engagement of the collar 67 with the flange 71.

The spring 70, which is preferably a coil spring but can be formed as any type of compressible spring having the desired bias against compression, opposes the movement of the collar 67 and guide block 68 along the rod 66 towards the flange 71. Thus, the spring 70 provides a force urging the roller 58 into engagement with the slack side 48 of the belt 18 to provide an appropriate amount of tension to the belt 18. The amount of force provided by the spring 70 upon initial movement of the collar 67 along the rod 66 towards the flange 71 can be adjusted by varying the position of the guide block 68 on the collar 67 using the threaded engagement of the block 68 with the collar 67. For example, by rotating the block 68 on the collar 67 along the threads away from the flange 71, the initial movement of the collar 67 on the rod 66 easily compresses the spring 70, in contrast to the configuration where the block 68 is moved closer to the flange 71, thus precompressing the spring 70 and providing greater resistance to the initial movement of the collar 67 along the rod 66. The movement of the pivot frame 51 based on the tension in the slack side 48 of the belt 18 can further be controlled by the presence of a pair of shock absorbers 76 secured between each pivot arm 52 and the adjacent support arm 62.

In operation, as the power demand increases in the power source 24 of the transmission system 10, the tension increases in the tension side 46 of the drive belt 18. This force stretches the drive belt 18 as the result of the belt 18 seating deeper in the channels 17 and 21 and grooves of each of pulleys 16 and 20, as well as elongation of the materials forming the belt 18. This results in a reduced tension on the slack side 48 of the belt 18. To compensate for this reduced tension, the idler roller 58, which is continuously engaged with the slack side 48, is urged to press downward against the slack side 48 by the bias of the compression spring 70 of each compression assembly 60, as described previously. The compression springs 70 thus ensure that the belt 18 is maintained at a desired slack tension level as the belt 18 travels around the driven pulley 15 and drive pulley 19 so that the belt 18 does not slip with respect to the pulleys 15 and 19. This is accomplished because the amount of force supplied by the springs 70 to maintain the roller 58 engaged with the belt 18 is proportional to the force of the belt 18 against the roller 58. Further, as the power demand from the driven element 12 on the power source 24 decreases, the load on the tension side 46 is reduced which decreases the overall stretch in the belt 18, increasing the tension in the slack side 48, which moves the idler 58 upward on the slack side 48 against the compression spring 70 to maintain the desired level of total tension on the belt 18.

While the above preferred embodiment for the tensioning assembly 50 referred to a power source 24 of 800 H.P. and up, a power source 24 within the range of 25 H.P. to 2,000 H.P. is contemplated as being within the scope of this project. Depending upon the size of the power source 24 used, it is also possible to use a tensioning assembly 50 that includes only one pivot arm 52 and biasing assembly 60 in conjunction with the idler roller 58, or only one biasing assembly 60 in conjunction with two pivot arms 52. Further, while the tensioning assembly 50 is shown in a horizontal position with idler 58 on top, this assembly 50 will function in other positions in which the power source 24 is positioned, such as, inverted and vertical, among others.

Also, while the tensioning assembly 50 is shown in the preferred embodiment as being controlled by the compression spring 70, it is also possible to modify the tensioning assembly 50 to include an air or hydraulic pressure system (not shown) that can be selectively operated by a controller (not shown) operably connected to the pressure system and to the power source 24. The controller will selectively operate the pressure system to increase or decrease the tension applied to the belt 18 based upon the load demand of the power source 24 in order to ensure the belt 18 does not slip with respect to the driven pulley 15 or drive pulley 19.

Further, each of the structural components of the invention, and specifically the tensioning assembly, is preferably formed of a rigid material, such as a metal or hard plastic, in order to enable the components to function properly and withstand the operational stresses exerted on the assembly 50 to provide a durable and low maintenance assembly 50.

Various alternatives are contemplated as being within the scope of the following claims particularly pointing out and distinctly claiming the subject matter regarded as the invention.

We claim:

1. A tensioning assembly for a power transmission system including a power source fixed to a support surface, an output shaft connected to the power source, a driver pulley fixed to the output shaft, a driven pulley connected to an input shaft of a driven element, and a belt interconnected between the driver pulley and the driven pulley, the tensioning assembly comprising:

a frame adapted to be pivotally mounted to the power transmission system adjacent the driver pulley;

an idler rotatably secured to the frame and adapted to engage the belt; and at least one biasing assembly adapted to be movably secured to the transmission system adjacent the frame, the at least one biasing assembly including a support arm connectable to the power transmission system, a rod pivotally connected to both the support arm adjacent a first end and to the frame adjacent a second end, and a biasing mechanism positioned on the rod between the pivoted connection to the frame and the second end of the rod, the biasing mechanism adapted to control the engagement of the idler with the belt.

2. The tensioning assembly of claim 1 wherein the biasing mechanism is a compression spring.

3. The tensioning assembly of claim 1 wherein the at least one biasing assembly includes a shock absorber pivotally connected between the support arm and the frame.

4. The tensioning assembly of claim 1 wherein the rod includes a guide block positioned on the rod and pivotally connected to the frame.

5. A tensioning assembly for a power transmission system including a power source fixed to a support surface, an output shaft connected to the power source, a driver pulley fixed to the output shaft, a driven pulley connected to an input shaft of a driven element, and a belt interconnected between the driver pulley and the driven pulley, the tensioning assembly comprising:
  a frame adapted to be pivotally mounted to the power transmission system adjacent the driver pulley;
  an idler rotatably secured to the frame and adapted to engage the belt; and
  at least one biasing assembly adapted to be movably secured to the transmission system adjacent the frame, the at least one biasing assembly including a support arm connectable to the power transmission system, a rod pivotally connected to both the support arm adjacent a first end and to the frame adjacent a second end, and a biasing mechanism positioned on the rod between the pivoted connection to the frame and the second end of the rod, the biasing mechanism adapted to control the engagement of the idler with the belt, wherein the rod includes a guide block positioned on the rod and pivotally connected to the frame and wherein the guide block is movably positioned on the rod.

6. The assembly of claim 5 wherein the rod includes a collar slidably mounted on the rod and movably engageable with the guide block.

7. The assembly of claim 6 wherein the collar is externally threaded and the guide block includes an internally threaded opening engageable with the external threads on the collar.

8. The assembly of claim 4 wherein the biasing member is a compression spring disposed between the guide block and the second end of the rod.

9. A tensioning assembly for a power transmission system including a power source fixed to a support surface, an output shaft connected to the power source, a driver pulley fixed to the output shaft, a driven pulley connected to an input shaft of a driven element, and a belt interconnected between the driver pulley and the driven pulley, the tensioning assembly comprising:
  a frame adapted to be pivotally mounted to the power transmission system adjacent the driver pulley;
  an idler rotatably secured to the frame and adapted to engage the belt; and
  at least one biasing assembly adapted to be movably secured to the transmission system adjacent the frame, the at least one biasing assembly including a support arm connectable to the power transmission system, a rod pivotally connected to both the support arm adjacent a first end and to the frame adjacent a second end, and a biasing mechanism positioned on the rod between the pivoted connection to the frame and the second end of the rod, the biasing mechanism adapted to control the engagement of the idler with the belt wherein the rod includes a guide block positioned on the rod and pivotally connected to the frame, wherein the biasing member is a compression spring disposed between the guide block and the second end of the rod, and wherein the second end of the rod includes a flange engageable with the spring opposite the guide block.

10. The assembly of claim 9 further comprising a cushioning member slidably mounted to the rod and engageable with the flange.

11. The assembly of claim 1 wherein the support arm includes a pivot block fixed to the support arm and pivotally engaged with the rod.

12. The assembly of claim 11 wherein the rod is positioned within the pivot block by an engagement member.

13. A power transmission system used to transmit power to a driven element including an input shaft, a driven pulley connected to the input shaft, and a belt operably connected to the driven pulley, the transmission system comprising:
  a power source supported on a base and having an output shaft and a driver pulley connected to the output shaft, the driver pulley adapted to be connected to the belt opposite the driven pulley;
  a frame pivotally attached to the base adjacent the power source;
  an idler rotatably secured to the frame and engaged with the belt; and
  a pair of biasing assemblies pivotally attached to the base adjacent opposite sides of the frame adjacent a first end of each assembly and pivotally attached to the frame adjacent a second end of each assembly, each biasing assembly including a support arm connectable to the power transmission system, a rod pivotally connected to both the support arm adjacent the first end and to the frame adjacent the second end, and a biasing mechanism positioned on the rod between the pivoted connection to the frame and the second end of the rod, wherein the biasing mechanism urges the idler into selective engagement with the belt.

14. The power transmission system of claim 13 wherein the driver pulley is secured to a shaft extension connected to the output shaft opposite the power source.

15. The transmission system of claim 14 wherein the shaft extension is rotatably supported between a pair of mounts attached to the base and spaced from the power source.

16. The transmission system of claim 13 wherein the frame includes a pair of frame arms pivotally secured to the base on opposite sides of the driver pulley.

17. The transmission system of claim 16 further comprising a pair of shock absorbers connected between each frame arm and the adjacent support arm.

18. A method for adjusting the tension on a belt extending between a driven pulley attached to an input shaft of a driven element and a driver pulley attached to an output shaft of a power source that is fixed to a base spaced from the driver element, the method comprising the steps of:
  a) providing a tensioning assembly including a frame pivotally mounted to the base adjacent the power source, an idler rotatably secured to the frame and engaged with the belt and at least one biasing assembly movably attached to the base adjacent the frame, the at least one biasing assembly having a support arm connectable to the power transmission system, a rod pivotally connected to both the support arm adjacent a first end and to the frame adjacent a second end, and a biasing mechanism positioned on the rod between the pivoted connection to the frame and the second end of the rod, the biasing mechanism adapted to control the engagement of the idler with the belt;
  b) operating the power source to tension the belt; and
  c) operating the biasing mechanism to adjust the force exerted by the idler on the belt to adjust the tension in the belt.

19. The method of claim 18 wherein the step of operating the biasing mechanism is performed automatically.

20. The method of claim 19 wherein the step of operating the biasing mechanism is performed non-electronically.

* * * * *